(12) United States Patent
Akita et al.

(10) Patent No.: US 9,319,883 B2
(45) Date of Patent: *Apr. 19, 2016

(54) CARD DEVICE

(71) Applicant: KABUSHIKI KAISHA TOSHIBA, Minato-ku, Tokyo (JP)

(72) Inventors: Koji Akita, Kanagawa (JP); Seiichiro Horikawa, Kanagawa (JP); Hideo Kasami, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,380

(22) Filed: Aug. 13, 2015

(65) Prior Publication Data

US 2015/0350909 A1    Dec. 3, 2015

Related U.S. Application Data

(63) Continuation of application No. 13/415,264, filed on Mar. 8, 2012, now Pat. No. 9,141,781.

(30) Foreign Application Priority Data

Jul. 14, 2011    (JP) .................................. 2011-155893

(51) Int. Cl.
*G05B 19/00* (2006.01)
*H04W 12/06* (2009.01)
*G06F 21/35* (2013.01)

(52) U.S. Cl.
CPC ............... *H04W 12/06* (2013.01); *G06F 21/35* (2013.01)

(58) Field of Classification Search
None
See application file for complete search history.

(56) References Cited

U.S. PATENT DOCUMENTS

| | | |
|---|---|---|
| 2004/0077335 A1 | 4/2004 | Lee et al. |
| 2006/0003739 A1 | 1/2006 | Sasakura et al. |
| 2006/0007897 A1 | 1/2006 | Ishii |
| 2006/0213981 A1 | 9/2006 | Suzuki et al. |
| 2007/0015589 A1 | 1/2007 | Shimizu et al. |
| 2008/0056495 A1 | 3/2008 | Eguchi et al. |
| 2008/0182623 A1 | 7/2008 | Youn |
| 2008/0184345 A1 | 7/2008 | Kaechi |

(Continued)

FOREIGN PATENT DOCUMENTS

| | | |
|---|---|---|
| JP | 2000322544 A | 11/2000 |
| JP | 2006202336 A | 8/2006 |

(Continued)

OTHER PUBLICATIONS

Japanese Office Action dated Sep. 9, 2014, issued in counterpart Japanese Application No. 2011-155893.

(Continued)

*Primary Examiner* — Ojiako Nwugo
(74) *Attorney, Agent, or Firm* — Holtz, Holtz & Volek PC (57) ABSTRACT

A card devices includes an authentication unit, a wireless communication unit, and a control unit. The authentication unit performs and authentication process with an external device via wired communication. The wireless communication unit performs wireless communication with the external device. The control unit controls the wireless communication unit to reduce radio waves radiated from the wireless communication unit when the control unit detects that the authentication process is being performed.

20 Claims, 5 Drawing Sheets

(56) References Cited

U.S. PATENT DOCUMENTS

| | | |
|---|---|---|
| 2008/0300020 A1 | 12/2008 | Nishizawa et al. |
| 2010/0019032 A1 | 1/2010 | Kim |
| 2010/0048144 A1 | 2/2010 | Fukami et al. |
| 2010/0069039 A1 | 3/2010 | Kawamura et al. |
| 2011/0238573 A1 | 9/2011 | Varadarajan |

FOREIGN PATENT DOCUMENTS

| | | |
|---|---|---|
| JP | 2008210301 A | 9/2008 |
| JP | 2010067060 A | 3/2010 |

OTHER PUBLICATIONS

Japanese Office Action dated Jan. 27, 2015, issued in counterpart Japanese Application No. 2011-155893.

CARD DEVICE

CROSS-REFERENCE TO RELATED APPLICATION(S)

This application is a Continuation application of U.S. Ser. No. 13/415,264, filed on Mar. 8, 2012, which is based upon and claims the benefit of priority from Japanese Patent Application No. 2011-155893, filed on Jul. 14, 2011, the entire contents of both of which are incorporated herein by reference.

FIELD

Embodiments described herein relate generally to a card device.

BACKGROUND

There has been conventionally known a card device that includes mounted therein an authentication unit configured to perform an authentication process with an external device via wired communication and a wireless communication unit configured to perform wireless communication to transmit and receive data.

For performing wireless communication, various electronic circuits are driven, and electromagnetic noise (radio waves) is radiated from such electronic circuits. Accordingly, if wireless communication is performed while an authentication process is being performed, an error may occur in the authentication result under the influence of electromagnetic noise caused with the wireless communication. In particular, since the authentication unit and the wireless communication unit are placed close to each other in a small space of the card device, electromagnetic noise radiated from the wireless communication unit has a significant impact on the authentication process performed by the authentication unit.

DETAILED DESCRIPTION

According to one embodiment, a card device includes an authentication unit, a wireless communication unit, and a control unit. The authentication unit performs an authentication process with an external device via wired communication. The wireless communication unit performs wireless communication with the external device. The control unit controls the wireless communication unit to reduce radio waves radiated from the wireless communication unit when the control unit detects that the authentication process is being performed.

Various embodiments will be described below in detail with reference to the accompanying drawings.

First Embodiment

Figure 1:
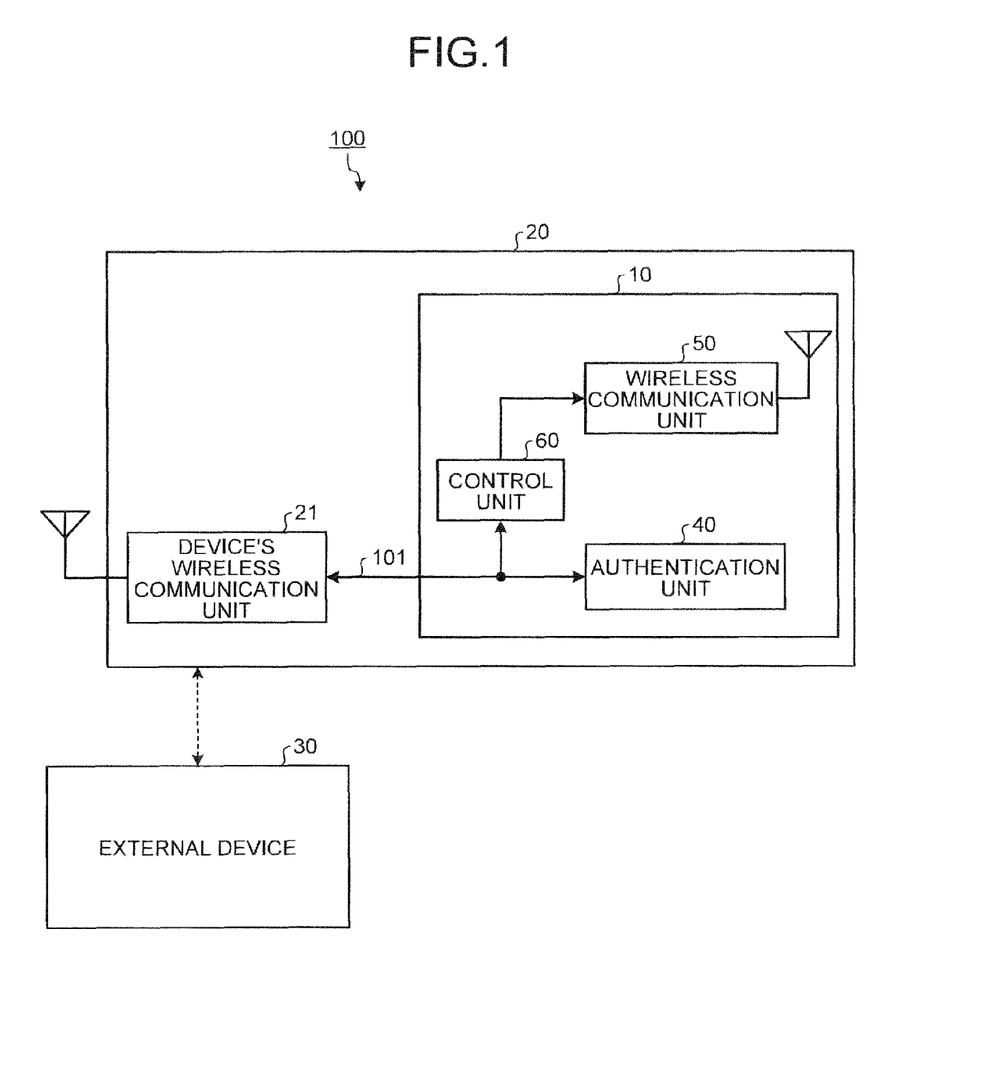
FIG. 1 is a diagram illustrating an exemplary schematic configuration of a communication system according to a first embodiment.

FIG. 1 is a block diagram illustrating an exemplary schematic configuration of a communication system 100 according to a first embodiment. As illustrated in FIG. 1, the communication system 100 includes a portable device (equipment) 20 in which a card device 10 is mounted and an external device 30. The device 20 may be of any type, and examples thereof include a cellular phone handset and a card-type terminal such as Suica (registered trademark). The external device 30 is a device that can communicate with the device 20, and may be a server device or a reader/writer capable of reading and writing data from/to the card device 10 mounted in the device 20, for example. Although a case where only one external device 30 capable of communicating with the device 20 is used is illustrated in FIG. 1, any number of the external devices 30 capable of communicating with the device 20 may be used, and there may be two or more external devices 30, for example.

The card device 10 is an electronic device in which various electronic components are mounted. As illustrated in FIG. 1, the card device 10 includes an authentication unit 40, a wireless communication unit 50 and a control unit 60. The authentication unit 40 performs an authentication process with the external device 30 via wired communication. The authentication unit 40 may be a secure element, for example. As illustrated in FIG. 1, the authentication unit 40 is connected to a device's wireless communication unit 21 provided in the device 20 via a signal line 101 used for wired communication. The device's wireless communication unit 21 wirelessly communicates with the external device 30. Although not illustrated in detail, the device's wireless communication unit 21 includes an electronic circuit, an antenna and the like for performing wireless communication. Examples of the antenna included in the device's wireless communication unit 21 include an antenna for near field communication (NFC) and an antenna for 3G. The antenna, however, is not limited thereto and any type of antenna can be employed. When the antenna for NFC is employed, this part may be called a contact less front end (CLF). In addition, the "authentication process" described above refers to a process for authenticating the card device 10. In this embodiment, the authentication of the card device 10 is performed by determining whether or not an identification number assigned to the card device 10 matches a preregistered identification number.

More specifically, the external device 30 first transmits a request signal requesting transmission of the identification number to the device 20. The request signal received by the device's wireless communication unit 21 is transmitted to the authentication unit 40 via the signal line 101. The authentication unit 40 that has received the request signal transmits the identification number assigned to the card device 10 to the external device 30 via the signal line 101 and the device's wireless communication unit 21. The authentication unit 40 may encrypt the identification number before transmission, for example. The external device 30 then decrypts the identification number transmitted from the device 20 in response to the request signal and determines whether or not the identification number obtained by the decrypt matches the preregistered identification number to authenticate the card device 10 mounted in the device 20. Note that a process for receiving the request signal by the authentication unit 40, a process for transmitting the identification number by the authentication unit 40 and the like correspond to the authentication process performed by the authentication unit 40, but these are only one example of the authentication process. Various known methods can be employed for the authentication process.

The wireless communication unit 50 performs wireless communication via radio waves with the external device 30. Although not illustrated in detail, the wireless communication unit 50 includes an electronic circuit, an antenna and the like for performing wireless communication.

When the control unit 60 detects that the authentication process is being performed by the authentication unit 40, the control unit 60 performs control to reduce the electromagnetic noise (radio waves) radiated from the wireless communication unit 50. Detailed description thereof will be given as follows. In this embodiment, the control unit 60 detects whether the authentication process is being performed on the basis of the state of the signal line 101. Since the authentication unit 40 performs the authentication process with the external device 30 via wired communication, a predetermined signal (a signal used for the authentication process) is transmitted through the signal line 101 when the authentication process is performed. More specifically, the current flowing through the signal line 101 and the voltage level thereon change. Since the current flowing through the signal line 101 and the voltage level thereon do not change when wired communication is not performed (that is, when the authentication process is not performed), it is possible to detect that the authentication process is being performed by detecting changes in the current flowing through the signal line 101 and the voltage level thereon.

When the control unit 60 detects that the authentication process is being performed as described above, the control unit 60 performs control to reduce the electromagnetic noise radiated from the wireless communication unit 50. For example, in this embodiment, when the control unit 60 detects that the authentication process is being performed, the control unit 60 controls the wireless communication unit 50 such that the operation of the wireless communication unit 50 is stopped. As a result of stopping the operation of the wireless communication unit 50, the electromagnetic noise radiated from the wireless communication unit 50 can be mostly eliminated.

Alternatively, the control unit 60 may reduce the data transfer rate of the wireless communication unit 50, for example. In general, the power consumption at an electronic circuit tends to be larger as the data transfer rate is higher, and the electromagnetic noise is also increased with the increase in the data transfer rate. The electromagnetic noise can therefore be reduced by lowering the data transfer rate.

Alternatively, the control unit 60 may make the wireless communication unit 50 operate intermittently. As a result of making the wireless communication unit 50 operate intermittently, there is a period during which the wireless communication unit 50 is stopped. Thus, the average amount of electromagnetic noise during a given period can be reduced. If the wireless communication unit 50 also operates intermittently during normal operation, the periods of the intermittent operation may be made longer. As a result, the average amount of electromagnetic noise during a given period can be reduced.

Alternatively, the control unit 60 may stop power supply to the wireless communication unit 50, for example. As a result, the electromagnetic noise radiated from the wireless communication unit 50 can be completely eliminated.

Figure 2:
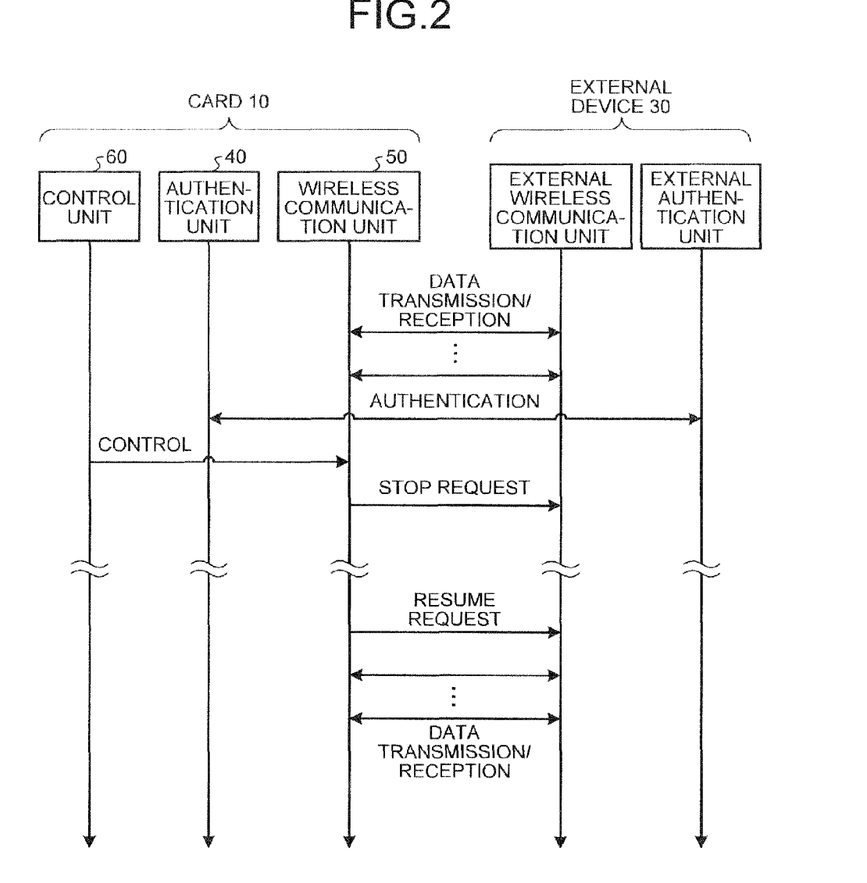
FIG. 2 is a diagram illustrating an example of procedures for stopping the operation of a wireless communication unit.
Figure 3:
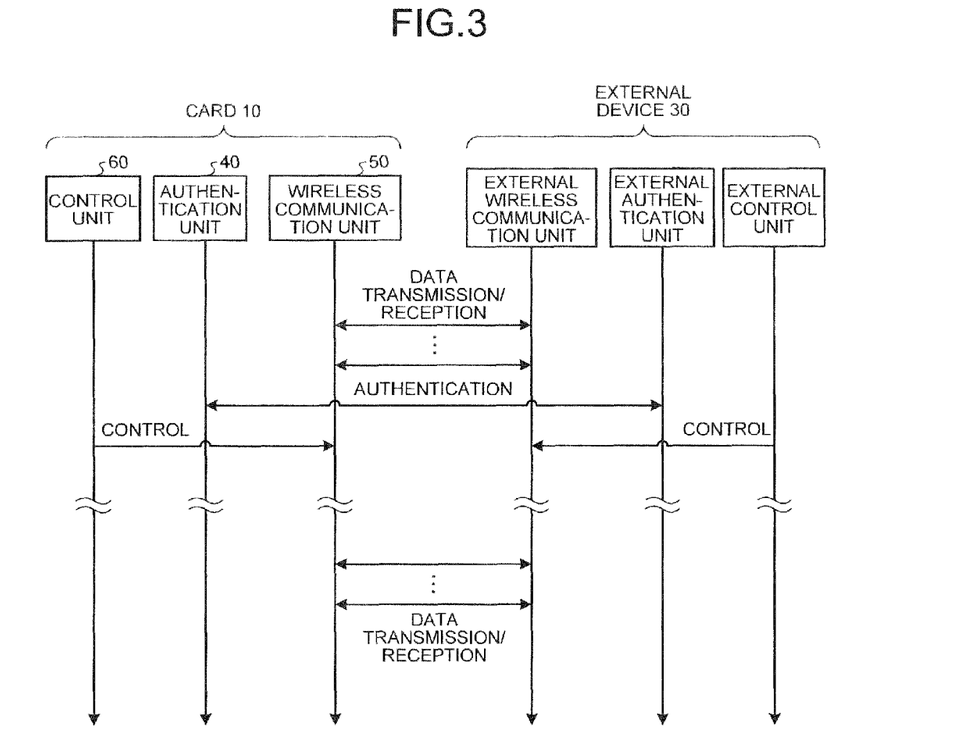
FIG. 3 is a diagram illustrating another example of procedures for stopping the operation of the wireless communication unit.

Next, procedures for stopping the operation of the wireless communication unit 50 will be described. For example, as illustrated in FIG. 2, when the control unit 60 detects that the authentication process is being performed, the control unit 60 may control the wireless communication unit 50 such that the operation of the wireless communication unit 50 is stopped and may also control the wireless communication unit 50 to transmit a stop request requesting to stop operating to an external wireless communication unit of the external device 30. Alternatively, with a configuration in which the external device 30 includes an external authentication unit configured to perform an authentication process and an external control unit configured to stop the operation of the external wireless communication unit when it is detected that an authentication process is being performed, for example, when the control unit 60 detects that the authentication process is being performed, the control unit 60 may control the wireless communication unit 50 such that the operation of the wireless communication unit 50 is stopped and the external control unit may control the external wireless control unit such that the operation of the external wireless communication unit is stopped as illustrated in FIG. 3.

For example, the control unit 60 may resume the operation of the wireless communication unit 50 after elapse of a predetermined time period from when the operation of the wireless communication unit 50 is stopped. Alternatively, the control unit 60 may resume the operation of the wireless communication unit 50 when the period during which the authentication process being performed is not detected has lasted longer than a predetermined length, for example.

While the procedures described above are those for stopping the operation of the wireless communication unit 50, procedures for lowering the data transfer rate of the wireless communication unit 50, for making the wireless communication unit 50 operate intermittently or the like are similar to those described above.

As described above, in this embodiment, when the control unit 60 detects that the authentication process is being performed, the control unit 60 performs control to reduce the electromagnetic noise radiated from the wireless communication unit 50. Therefore, an advantageous effect that occurrence of errors in the authentication result under the influence of the electromagnetic noise radiated from the wireless communication unit 50 can be reduced is produced.

Second Embodiment

Next, a second embodiment will be described. The second embodiment is different from the first embodiment in that the control unit 60 detects whether the authentication process is being performed on the basis of the state of power supply to the authentication unit 40. Detailed description thereof will be given below. Note that description of parts that are the same as those in the first embodiment will not be repeated as appropriate.

Figure 4:
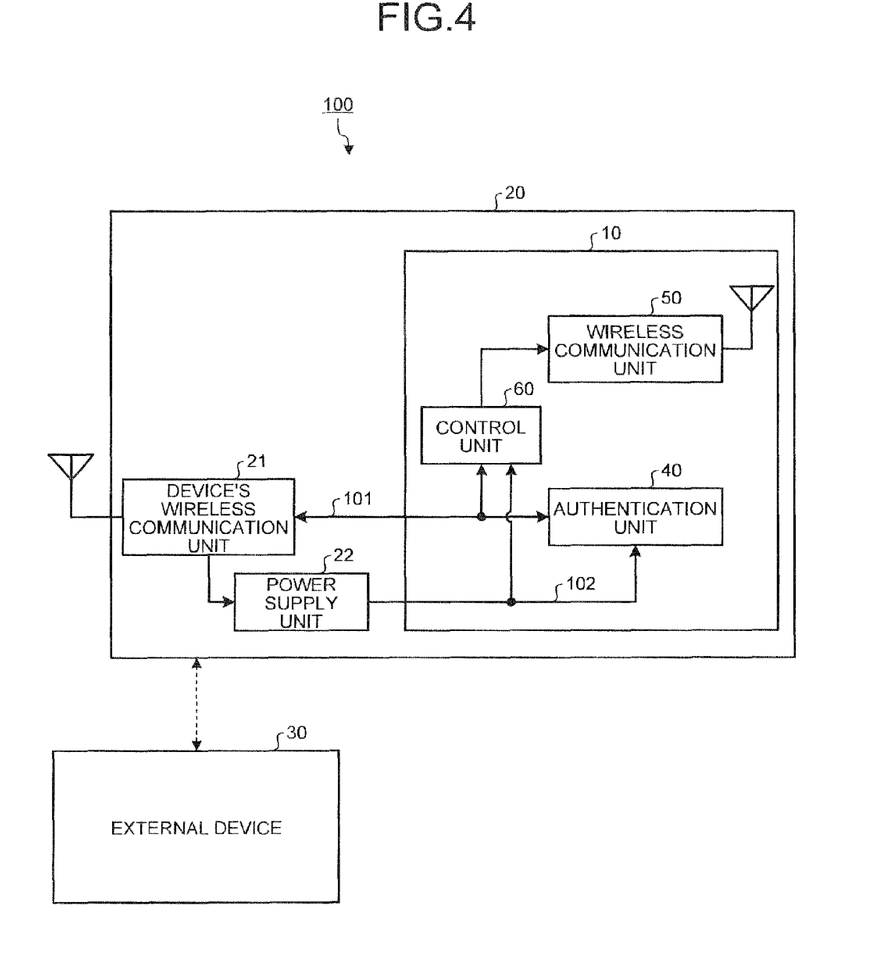
FIG. 4 is a diagram illustrating an exemplary schematic configuration of a communication system according to a second embodiment.

FIG. 4 is a block diagram illustrating an exemplary schematic configuration of a communication system 100 according to the second embodiment. In this example, power is supplied to the device 20 through electromagnetic induction using lines of magnetic force generated by the external device 30 when the device 20 is brought close to the external device 30. More specifically, the device's wireless communication unit 21 includes a coil, and current is generated in the coil of the device's wireless communication unit 21 when the lines of magnetic force emitted from the external device 30 pass through, the coil. The generated current is rectified and smoothened by a power supply unit 22 provided in the device 20, and supplied to the authentication unit 40 via a power line 102. After power is supplied to the authentication unit 40 and the authentication unit 40 is activated, the authentication process is started.

In this embodiment, the control unit 60 detects whether the authentication process is being performed on the basis of the state of the power line 102. More specifically, the control unit 60 can detect whether or not power is being supplied to the power line 102 on the basis of the current flowing through the power line 102 and the voltage level thereon. When the control unit 60 detects that power is being supplied to the power line 102, the control unit 60 detects that the authentication process is being performed and performs control to reduce the electromagnetic noise radiated from the wireless communication unit 50 similarly to the first embodiment.

As described above, since the authentication unit 40 starts the authentication process after receiving power supply and being activated, the authentication process is not yet performed at the time point when the power supply to the power line 102 is started. Accordingly, the control unit 60 preferably performs control to reduce the electromagnetic noise radiated from the wireless communication unit. 50 when the control unit 60 detects that the power supply to the power line 102 is started. As a result, noise radiated from the wireless communication unit 50 can be reduced before the authentication process is started. There is thus an advantage that occurrence of errors in the authentication result can be reduced as compared to a configuration by which noise radiated from the wireless communication unit 50 is reduced during the authentication process.

In this embodiment, the authentication unit 40 performs the authentication process after receiving power supply. The method of detecting whether the authentication process is being performed on the basis of the state of the power line 102 is therefore more advantageous in that the authentication process being performed can be detected at an earlier timing than the method of detecting whether the authentication process is being performed on the basis of the state of the signal line 101.

Figure 5:
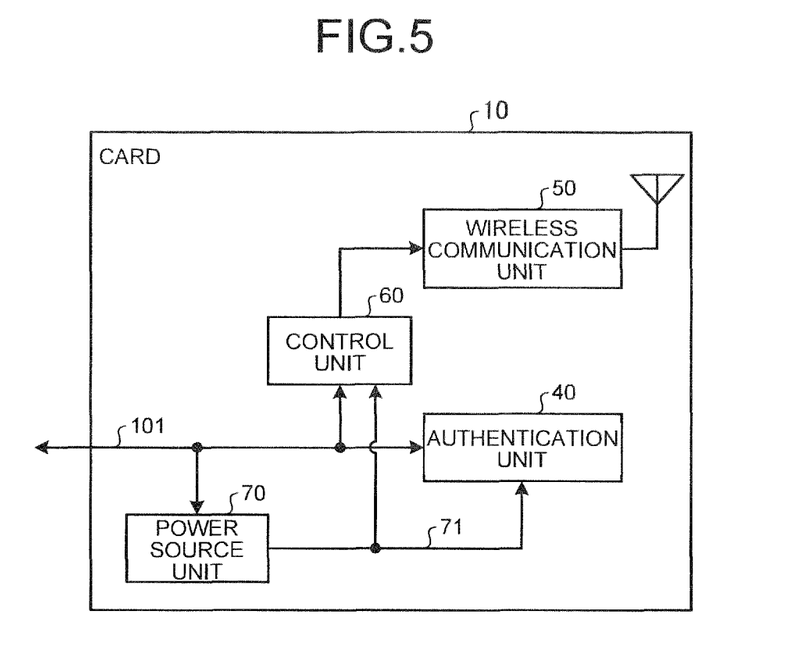
FIG. 5 is a diagram illustrating a modified example of a card device according to the second embodiment.

Alternatively, a configuration in which a power source unit 70 that includes a battery or the like is provided in the card device 10 as illustrated in FIG. 5 may be used instead of power supply to the device 20 through electromagnetic induction as described above. Power from the power source unit 70 is supplied to the authentication unit 40 via a power line 71. The control unit 60 may control the power source unit 70 to supply power to the authentication unit 40 when the control unit 60 detects that a signal used for an authentication process is output to the signal line 101. With such a configuration as well, the control unit 60 can detect that the authentication process is being performed by detecting power supply to the power line 71.

With the configuration described above, occurrence of errors in the authentication result under the influence of the electromagnetic noise radiated from the wireless communication unit 50 can be reduced.

Third Embodiment

Next, a third embodiment will be described. The third embodiment is different from the first embodiment in that the authentication unit 40 outputs a signal (hereinafter referred to as an "indicator signal") indicating that the authentication process is being performed to the control unit 60 when performing the authentication process, and that the control unit 60 detects that the authentication process is being performed when the indicator signal is received. Detailed description thereof will be given below. Note that description of parts that are the same as those in the first embodiment will not be repeated as appropriate.

Figure 6:
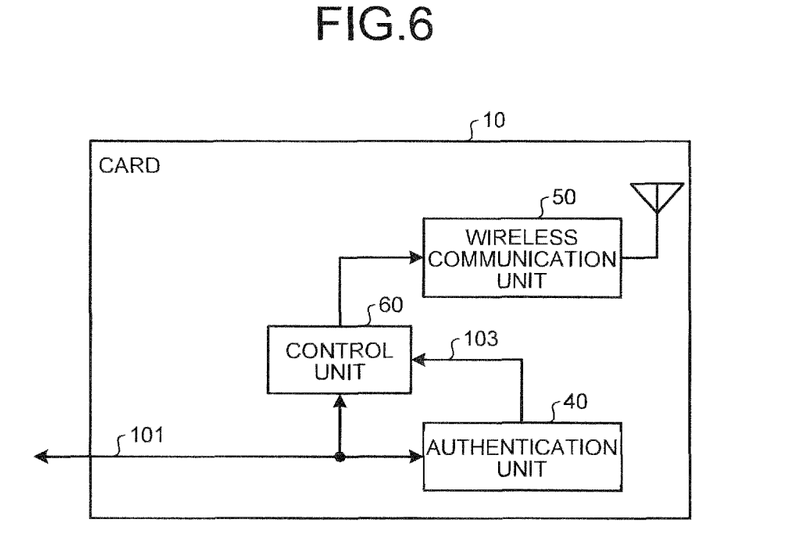
FIG. 6 is a diagram illustrating an exemplary configuration of a card device according to a third embodiment.

FIG. 6 is a diagram illustrating an exemplary configuration of a card device 10 according to the third embodiment. As illustrated in FIG. 6, the difference from the first embodiment is that the card device 10 further includes an indicator line 103 connecting the authentication unit 40 and the control unit 60. In this embodiment, the authentication unit 40 outputs an indicator signal when performing the authentication process. The indicator signal is transmitted to the control unit 60 via the indicator line 103. The control unit 60 detects that the authentication process is being performed when the control unit 60 receives the indicator signal, and performs control to reduce the electromagnetic noise radiated from the wireless communication unit 50 similarly to the first embodiment. With this configuration as well, occurrence of errors in the authentication result under the influence of the electromagnetic noise radiated from the wireless communication unit 50 can be reduced.

Any type of the card device 10 may be used, and examples thereof include an SD card, a micro SD card, a SIM card and an IC card.

Moreover, when the control unit 60 detects that the authentication process is being performed, it may control the wireless communication unit 50 to perform only a connection process for connecting with a device to communicate with after the authentication process but not to perform transmission/reception of data. The device to communicate with after the authentication process may be the external device 30 for which the authentication process is performed or may be another external device 30. Note that, when data are to be transmitted/received through wireless communication, the connection process needs to be performed before the transmission/reception. The connection process, however, typically requires a smaller amount of processing than transmission/reception of data, and the amount of electromagnetic noise radiated from the wireless communication unit 50 thus tends to be smaller. In addition, when data are to be transmitted/received to/from a certain external device 30 after completion of the authentication process, performing the connection process for connecting with this external device 30 during the authentication process allows the transmission/reception of data after the authentication process to be started promptly. According to the above-described configuration, advantageous effects that occurrence of errors in the authentication result under the influence of the electromagnetic noise radiated from the wireless communication unit 50 can be reduced and that transmission/reception of data after the authentication process can be started promptly are therefore produced. Note that the connection process for connecting with the external device 30 means a process for getting ready for communication with the external device 30.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device comprising:
    an authenticator that performs an authentication process via wired communication;
    a wireless communicator that performs wireless communication other than the authentication process, wherein radio waves radiated from the wireless communicator are reduced at least during part of a period during which the authentication process is performed.

2. The wireless communication device according to claim 1, wherein the radio waves radiated from the wireless communicator are reduced due to at least one of stopping of power supplied to the wireless communicator, intermittent operation of the wireless communicator, and lowering of a data transfer rate of the wireless communicator.

3. The wireless communication device according to claim 1, wherein the radio waves radiated from the wireless communicator are stopped at least during the part of the period during which the authentication process is performed.

4. The wireless communication device according to claim 1, further comprising:
    a controller that performs control so as to reduce the radio waves radiated from the wireless communicator when the controller detects that the authentication process is performed.

5. The wireless communication device according to claim 1, wherein the wireless communicator is driven with power from a power source mounted in the wireless communication device or power from a device connected to the wireless communication device.

6. The wireless communication device according to claim 5, wherein the power source includes a battery.

7. The wireless communication device according to claim 4, wherein, when the controller detects that the authentication process is performed, the controller controls the wireless communicator to perform only a connection process for connecting to a device that performs communication after the authentication process and not to perform transmission and reception of data.

8. The wireless communication device according to claim 4, wherein the controller detects that the authentication process is performed based on a state of a signal line used for the wired communication.

9. The wireless communication device according to claim 4, further comprising:
    a power line that is connected to the authenticator and that is used for supplying power to the authenticator, wherein the controller detects that the authentication process is performed based on a state of the power line.

10. The wireless communication device according to claim 4, wherein:
    when performing the authentication process, the authenticator outputs, to the controller, a signal indicating that the authentication process is being performed, and
    when the controller receives the signal, the controller detects that the authentication process is performed.

11. The wireless communication device according to claim 1, wherein the wireless communicator includes an antenna.

12. The wireless communication device according to claim 1, wherein:
    the authenticator is connected to a signal line used for the authentication process; and
    the wireless communicator is not connected to the signal line.

13. The wireless communication device according to claim 1, wherein:
    the wireless communication device is mounted on a device; and
    the authenticator performs the authentication process with an external device.

14. The wireless communication device according to claim 13, wherein communication between the device and the external device is performed wirelessly.

15. The wireless communication device according to claim 1, wherein the wireless communication device includes one of an SD card, a micro SD card, a SIM card, and an IC card.

16. A device comprising:
    the wireless communication device according to claim 1 mounted thereon.

17. The device according to claim 16, wherein the device is a cellular phone handset.

18. A controlling method, comprising:
    performing control at least during part of a period during which an authentication process via wired communication is performed so as to reduce radio waves radiated from a wireless communicator performing wireless communication other than the authentication process.

19. The controlling method according to claim 18, wherein the radio waves radiated from the wireless communicator are reduced due to at least one of stopping of power supplied to the wireless communicator, intermittent operation of the wireless communicator, and lowering of a data transfer rate of the wireless communicator.

20. The controlling method according to claim 18, wherein the radio waves radiated from the wireless communicator are stopped at least during the part of the period during which the authentication process is performed.

* * * * *